(12) United States Patent
Ashman (10) Patent No.: US 7,926,886 B1
(45) Date of Patent: Apr. 19, 2011

(54) CYCLE WHEEL MOUNTING SYSTEM

(76) Inventor: J. Leonard Ashman, Folsom, CA (US)

( * ) Notice: Subject to any disclaimer, the term of this patent is extended or adjusted under 35 U.S.C. 154(b) by 231 days.

(21) Appl. No.: 12/316,813

(22) Filed: Dec. 17, 2008

Related U.S. Application Data (63) Continuation-in-part of application No. 12/215,809, filed on Jun. 30, 2008.

(60) Provisional application No. 60/937,970, filed on Jul. 2, 2007.

(51) Int. Cl.
*B60B 27/00* (2006.01)

(52) U.S. Cl. .................................. 301/110.5; 301/124.2
(58) Field of Classification Search .............. 301/110.5, 301/124.2; 192/64
See application file for complete search history.

*Primary Examiner* — Russell D Stormer
(74) *Attorney, Agent, or Firm* — Thomas R. Lampe (57) ABSTRACT

Apparatus for mounting a cycle wheel on a cycle wheel frame including two axle segments connected to cycle frame mounting lugs, a freewheel body being mounted on one of the axle segments and a hub being mounted on the other of the axle segments. A lock bolt extends through the hub and the axle segment supporting the hub and threadedly engages the axle segment supporting the freewheel body.

9 Claims, 6 Drawing Sheets

CYCLE WHEEL MOUNTING SYSTEM

This application is a continuation-in-part of U.S. patent application Ser. No. 12/215,809, filed Jun. 30, 2008, which was based on and claimed the benefit of U.S. Provisional Patent Application No. 60/937,970, filed Jul. 2, 2007.

TECHNICAL FIELD

This invention relates to apparatus for readily mounting a cycle wheel on a cycle frame or detaching the wheel from the frame. The invention has particular, but not exclusive, application to bicycle wheels driven by cogsets.

BACKGROUND OF THE INVENTION

Chain driven bicycle drive trains have existed for many years. Generally the chain receives power input from a pedal crank that has a motive force exerted upon it by a rider's legs. The force is transferred by the chain to the driven wheel by a geared cog, for example, which is in turn mechanically linked to a hub. The hub is attached to the drive wheel by means of spokes or solid inserts such as in the so-called disk wheels. In this way linear force from a rider's legs is transformed into rotational force applied to the wheel and then to the road surface.

From time to time the wheel must be detached from the bicycle frame, for example, to change a flat tire or to replace a worn part. There exist many contemporary methods for attaching a wheel to a bicycle frame. One method uses a solid axle threaded on both ends. Once the axle ends have been located correctly in the frame, nuts are tightened to fix the wheel in place. A second method uses a hollow axle through which a rod, or so-called skewer, is run. One end of the skewer has a lever and the other end an adjustable nut. Once the wheel is in the correct position the lever is operated which results in a clamping force being applied to fix the wheel in place.

While these methods are functional, they suffer from a common flaw. The chain must be disengaged from the drive cogs in order to remove the wheel. Depending on the complexity of the cogset, this can be a messy and time consuming operation. For example, consider a ten speed cogset typical of contemporary road or mountain bicycles. In order to remove the wheel the chain must be driven to the smallest cog in order to provide the requisite slack chain tension to allow the wheel to drop away from the frame. Once done, the derailleur mechanism, which is used to move the chain up and down the cogset, must be held out of the way so that the cogset, which is attached permanently to the wheel, will have the needed clearance to drop away from the frame lugs.

Once the wheel is clear, maintenance can take place. But the same problems exist upon remounting of the wheel. First the derailleur must be moved out of the way, then the chain must be manually placed on the correct cog, then the wheel carefully moved into the frame lugs and the securing mechanism engaged. One major problem with prior art methods is that it is difficult to ensure the proper alignment of the wheel in the frame lugs. This happens in part because the chain exerts an off-axis load on the cogset which tends to make the wheel align off center. The result is that the wheel may then interfere with the brake mechanism causing an unwanted drag.

A second major problem with prior art methods is that the derailleur is very delicate. If the user inadvertently applies a force in the wrong place the alignment of the derailleur box could be affected. This is so because the derailleur is essentially a parallelogram that moves the chain left or right depending on the rider's selection of gear. Any misalignment will cause difficulty in shifting. Finally, since the chain is now on the smallest cog, the shifter mechanism must once again be operated to place the chain on a cog that will allow a rider to easily get moving.

My U.S. Pat. Nos. 5,549,315 and 5,823,555 generally disclose cycle wheel mounting apparatus for facilitating installation and removal of cycle wheels employing notches for releasably interconnecting cycle frames and wheel hubs. The following patent documents are also known: U.S. Pat. No. 4,079,958, issued March, 1978, U.S. Pat. No. 4,170,369, issued October, 1979, U.S. Pat. No. 4,400,038, issued August, 1983, U.S. Pat. No. 4,634,139, issued January, 1987, U.S. Pat. No. 4,659,097, issued April, 1987, U.S. Pat. No. 4,805,941, issued February, 1989, U.S. Pat. No. 5,022,672, issued June, 1991, U.S. Pat. No. 5,058,913, issued October, 1991, U.S. Pat. No. 5,118,125, issued June, 1992, U.S. Pat. No. 5,284,383, issued February, 1994, U.S. Pat. No. 5,326,157, issued July, 1994, U.S. Pat. No. 5,601,299, issued February, 1997, U.S. Pat. No. 6,290,304, issued Sep. 18, 2001 and U.S. Pat. No. 6,647,643, issued July, 1997, U.S. Pat. No. 6,435,622, issued August, 2002, U.S. Pat. No. 6,409,281, issued June, 2002, U.S. Pat. No. 6,669,306, issued December, 2003, U.S. Pat. No. 6,454,363, issued September, 2002, U.S. Pat. No. 6,386,643, issued May, 2002, U.S. Pat. No. 6,296,322, issued October, 2001, U.S. Pat. No. 4,079,958, issued March, 1978, U.S. Pat. No. 5,984,423, issued November, 1999, U.S. Pat. No. 6,089,675, issued July, 2000, U.S. Pat. No. 5,823,555, issued October, 1998, U.S. Pat. No. 6,290,304, issued September, 2001, U.S. Patent Pub. Appl. No. 2007/0052286, published March, 2007, U.S. Pat. No. 7,252,344, issued August, 2007, U.S. Pat. No. 5,549,315, issued August, 1996, U.S. Patent App. Pub. No. 2007/0287574, published December, 2007, U.S. Pat. No. 5,332,294, issued July, 1994, U.S. Patent App. Pub. No. 2008/0157586, July, 2008, U.S. Pat. No. 6,561,593, issued May, 2003, U.S. Pat. No. 7,011,321, issued March, 2006, U.S. Pat. No. 6,030,052, issued February, 2000, U.S. Pat. No. 5,531,510, issued July, 1996, U.S. Pat. No. 4,664,252, issued May, 1987, U.S. Pat. No. 4,679,862, issued July, 1987, U.S. Pat. No. 4,595,242, issued June, 1986, U.S. Pat. No. 4,567,973, issued February, 1986, U.S. Pat. No. 4,049,319, issued September, 1977, U.S. Pat. No. 5,165,762, issued November, 1992, U.S. Pat. No. 5,121,973, issued June, 1992, U.S. Pat. No. 4,906,053, issued March, 1990, U.S. Pat. No. 4,170,369, issued October, 1979, U.S. Pat. No. 6,497,314, issued December, 2002, U.S. Pat. No. 6,523,659, issued February, 2003, U.S. Pat. No. RE39,528, issued March, 2007, U.S. Pat. No. 5,433,306, issued July, 1995, U.S. Patent App. Pub. No. 2006/0158022, published July, 2006, U.S. Pat. No. 7,367,632, issued May, 2008, U.S. Patent App. Pub. No. 2002/0067069, published June, 2002, U.S. Patent App. Pub. No. 2002/0067068, published June, 2002, French Patent No. 2518-461, dated June, 1983, French Patent No. 2776-612, dated March, 1998, French Patent No. 2501-124, dated March, 19871, French Patent No. 2188-551, dated June, 1972, Italian Patent No. 596057, dated October, 1958, Dutch Patent No. 9218 358.1, dated October, 1994, Dutch Patent No. 1 155 355, dated April 1964, French Patent No. 668,943, dated March, 1952, Great Britain Patent No. 572,237, dated September, 1945, Japanese Patent No. 55 51601, European Patent Application No. 0 094 649, dated November, 1983, European Patent No. 0 277 576, dated January, 1988, European Patent Application No. 1 211 102, dated November, 2001, European Patent No. 0 835 188, dated July, 1996, and PCT Publication No. WO 89/04258, dated May, 1989.

The invention disclosed in my co-pending U.S. patent application Ser. No. 12/215,809, filed Jun. 20, 2008, of which this application is a continuation-in-part, relates to apparatus for a driven bicycle hub that eliminates the need for a user to become involved in any way with the cogset or chain. The hub assembly of the apparatus is comprised of three main pieces: a non-driven side slotted receiver, a driven side receiver and a center section that positively mates with both receivers. A solid axle attaches the three main pieces together in a two stage threading action. The mating action is such that misalignment of the wheel is impossible.

The non-driven side slotted receiver is permanently attached to the non-driven side frame lug. The driven side receiver, which has the cogset and thus the chain mounted to it, is attached to the driven side frame lug. The center section is hollow to allow a solid axle to pass through it. The solid axle has a handle on one end and is threaded on the opposite end. At a point close to the threaded end the axle has a unique hex segment that is used to engage a captive sleeve that also runs through the center section.

In operation, the user turns the knob to loosen the axle from the driven side frame lug mounting hardware, slides the axle outwardly until the hex segment engages the captive sleeve, again uses the knob to loosen the center section from the driven side receiver, and then slides the axle out to its outward-most position. At this point the center section with the wheel may be removed from the bicycle. Since the cogset and chain are still mounted in place on the driven side receiver, the user need not become involved with either in order to remove the wheel.

A major advantage of the invention of U.S. patent application Ser. No. 12/215,809 is that the alignment of the cogset, chain and derailleur does not change. Thus it is impossible to cause damage to the delicate derailleur when dismounting or remounting the driven wheel. Further, since the center section mates with the non-driven side slotted receiver and driven side receiver in a singular way, there is no possibility of misaligning the wheel upon remounting to the bicycle frame.

DISCLOSURE OF INVENTION

The present invention also relates to apparatus which eliminates the need for a user to get involved in any way with a cogset or chain when detaching a cycle wheel from a frame or when installing a cycle wheel. The apparatus is characterized by its ease of use as well as by its stability during use.

The apparatus is for mounting a cycle wheel on a cycle frame, said cycle frame having first and second mounting legs. The apparatus includes a first axle segment connected to the first mounting lug and extending inwardly therefrom toward the second mounting lug.

A second axle segment is connected to the second mounting lug and extends inwardly therefrom toward the first mounting lug.

A freewheel body is mounted on the second axle segment.

The apparatus additionally incorporates a cycle wheel hub including a hub casing defining a hub casing interior and hub casing open ends communicating with the hub casing interior. The wheel hub also includes a hub casing support member defining a passageway and extending through a hub casing open end into the hub casing interior.

A lock bolt extends through the first mounting lug, the first axle segment and the cycle wheel hub. The lock bolt is selectively axially movable between a first position wherein the lock bolt engages the second axle segment to provide support for the cycle wheel hub and position the cycle wheel hub in driving engagement with the freewheel body and a second position wherein the cycle wheel hub is disengageable and separable from the freewheel body.

A quick-release cam clamp structure is operatively associated with the lock bolt, the first axle segment, and the first mounting lug to clampingly attach the first axle segment to the first mounting lug when the lock bolt is in the first position and allow the first axle segment to disconnect from the first mounting lug when the lock bolt is in the second position.

Other features, advantages and objects of the present invention will become apparent with reference to the following description and accompanying drawings.

BEST MODE FOR CARRYING OUT THE INVENTION

Referring now to the drawings, mounting lugs 10, 12 of a bicycle frame are illustrated. In this instance, the mounting lugs define slots 14 of the type commonly employed in the prior art to receive wheel axles and related hardware secured in place by lug nuts or other suitable means.

Connected to mounting lug 12 and extending inwardly therefrom toward mounting lug 10 is an axle segment 16 held in place by nuts 18, 20 threadedly engaged therewith. Internal threads 22 are located at the distal end of axle segment 16. Bearings 24 are press fit onto axle segment 16. Two bearings 24 are employed to both increase the load bearing surface and to increase lateral stability of the associated wheel during use.

Freewheel body 26 is connected to axle segment 16 and bearings 24. The freewheel body 26 has a cogset 28 mounted thereon. A chain (not shown) drives the individual cogs during use in a conventional fashion. The freewheel body 26, the cogset 28 and the chain that drives the individual cogs remain attached to the bicycle frame at frame lug 12 before, during and after dismounting of the bicycle wheel, in the manner described below.

An axle segment 30 is connected to the mounting lug 10 and extends inwardly therefrom toward the mounting lug 12. The axle segment 30 is hollow and has a reduced end which is located in the slot 14 of mounting lug 10. An adjustment nut 32 is threadedly engaged with the axle segment and abuts against the inner surface of mounting lug 12.

Rotatably mounted on axle segment 30 is a hub casing 34 defining a hub casing interior and hub casing open ends communicating with the hub casing interior. Bearings 36, 38 disposed in the interior of hub casing 34 between the hub casing and axle segment 30 allow the hub casing 34 to rotate relative to axle segment 30.

The cycle wheel hub further includes a hub casing support member in the form of hollow threaded shouldered sleeve 40 extending through an open end of the hub casing and into the hub casing interior. The threads 42 of the hub casing support member are threaded to the hub casing and when extending from the hub casing are threaded to freewheel body 26.

An elongated lock bolt 44 extends through the mounting lug 10, the axle segment 30 and the cycle wheel hub. The lock bolt is selectively axially movable between a first position (shown in FIGS. 6 and 7 for example) wherein the lock bolt engages the axle segment 16 to provide support for the cycle wheel hub and position the cycle wheel hub in driving engagement with the freewheel body and a second position (shown in FIG. 9 for example) wherein the cycle wheel hub is disengageable and separable from the freewheel body.

In particular, when in the first position, a threaded distal end 46 of the lock bolt is threadedly engaged with internal threads 22 of axle segment 16. The lock bolt has a proximal end 50 connected to quick-release cam clamp structure 52 and also has a threaded portion 54 in threaded engagement with internal threads 56 located at the end of axle segment 30 disposed within hub casing 34.

The quick-release cam clamp structure 52 is operatively associated with the lock bolt 44, the axle segment 30 and the mounting lug 10 to clampingly attach the axle segment 30 to the mounting lug 10 when the lock bolt is in the first position described above. When the lock bolt 44 is in the second position described above, the axle segment 30 is allowed to detach from the mounting lug 10. The end of the axle segment 30 projecting through slot 14 is in the configuration of a hex 58. Immediately adjacent to hex 58 is a threaded section 60 and adjustment nut 32 threadedly engages threaded section 60 and engages the inner surface of mounting lug 10.

The quick-release cam clamp structure 52 includes an outer housing 64 having an inner plunger-like member 66 slidably positioned therein. The proximal end of the lock bolt 44 has a generally T-shaped cross-section and is disposed within a correspondingly shaped recess 68 of member 66 to maintain an interconnection therebetween. An adjustment nut 70 is threadedly engaged with outer casing 64, slides over the lock bolt end member 66 and performs a clamping function.

Figure 1:
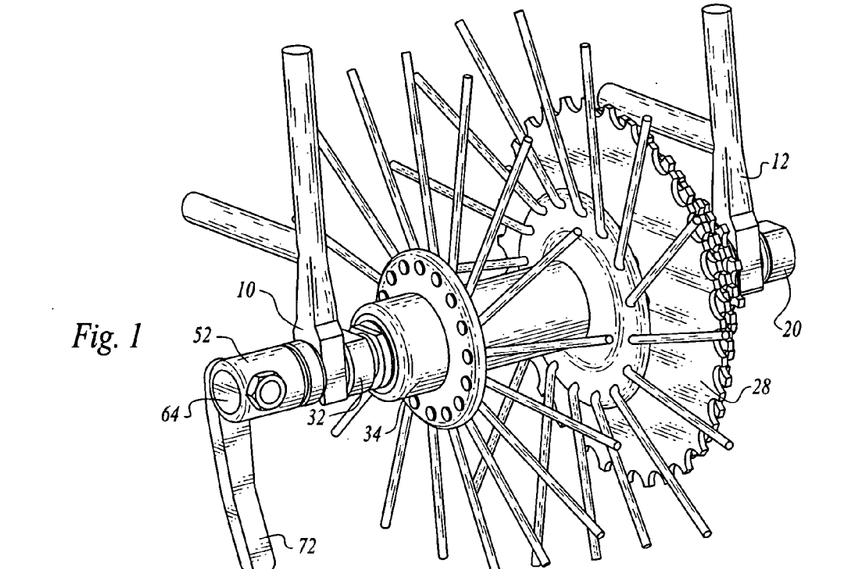
FIGS. 1 and 2 are perspective views showing apparatus constructed in accordance with teachings of the present invention mounted on bicycle frame lugs in operative association with a drive cogset of a freewheel body.
Figure 2:
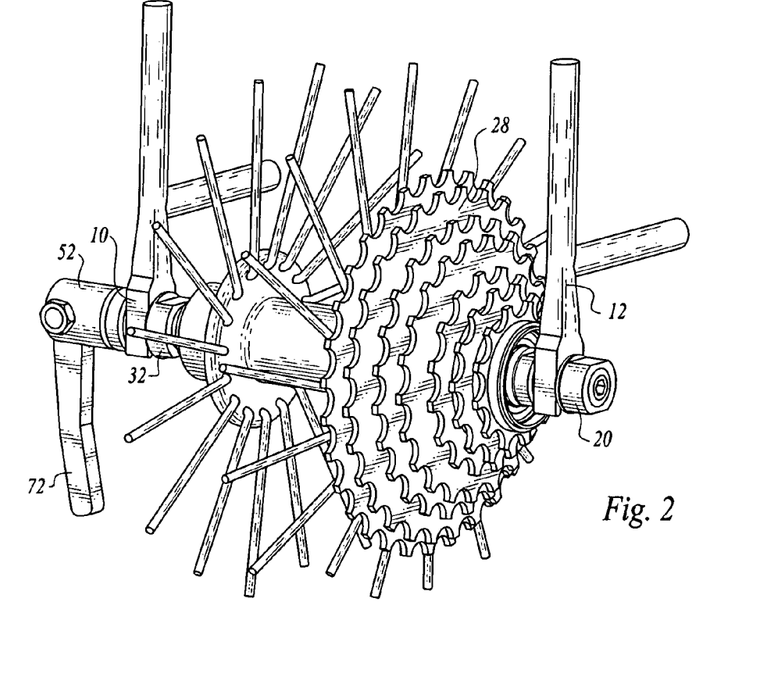
Figure 6:
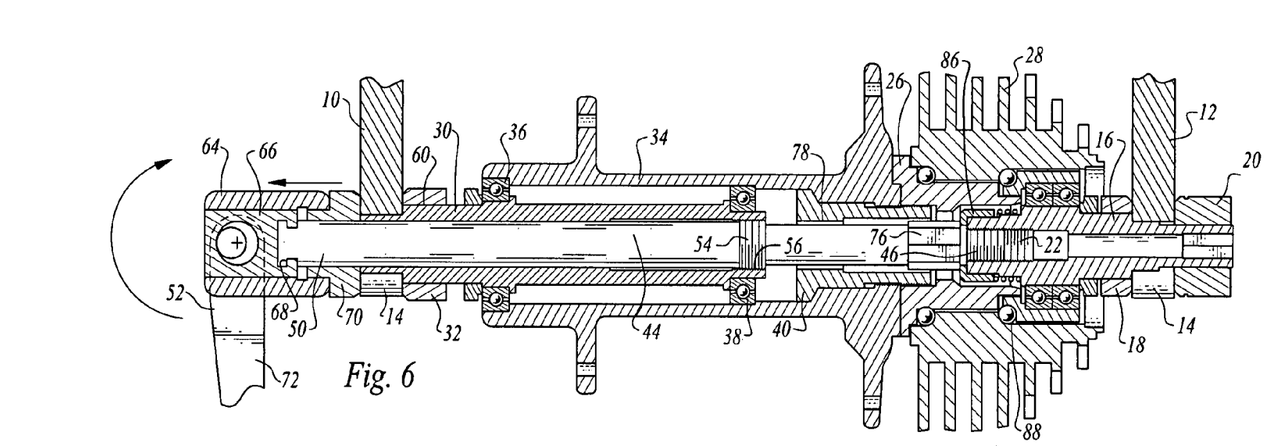
FIG. 6 is a cross-sectional view of the apparatus mounted on cycle frame lugs.

When the lock bolt 44 is in its first position, as described above, the handle 72 of the quick-release cam clamp structure is in the orientation shown in FIGS. 1, 2 and 6, and a cam 74 associated with the handle clamps the axle segment 30 to mounting lug 10. More particularly, relative movement between the adjustment nut 70 and the adjustment nut 32 causes them to clampingly engage opposed sides of mounting lug 10.

Figure 7:
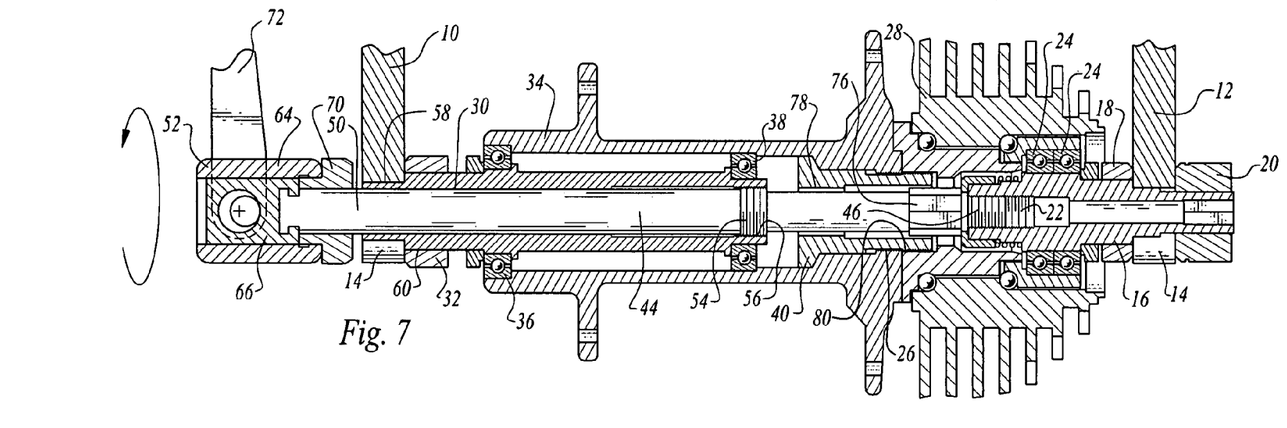
FIG. 7 is a view similar to FIG. 6, but illustrating the cam clamp structure in released condition.

When however the handle 72 is displaced 180 degrees to an upward orientation as shown in FIG. 7, the adjustment nuts no longer clamp mounting lug 10 and rotation of the handle about the axis of lock bolt 44 as shown in FIG. 7 will cause corresponding rotation of lock bolt 44. This action, when continued, will cause the threaded distal end 46 of the lock bolt to disengage from the internal threads 22 of axle segment 16. Substantially simultaneously, the threaded portion 54 of the lock bolt will disengage from the internal threads 56 of axle segment 30.

Figure 8:
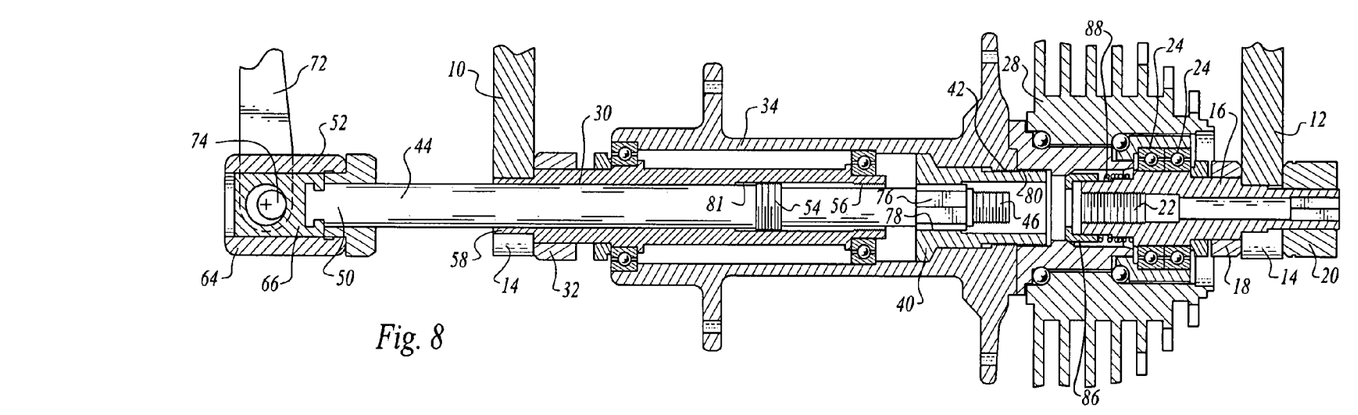
FIG. 8 is a view similar to FIGS. 6 and 7, but illustrating the lock bolt partially withdrawn and engaging a hub casing support member.

An octagonally shaped protrusion 76 is formed on the lock bolt between the threaded and distal end 46 and the threaded portion 54. This protrusion is brought into engagement with a correspondingly shaped opening 78 formed in the hub casing support member 40 as shown in FIG. 8. Rotation of the lock bolt at this stage of operation will cause the hub casing support member to rotate. The hub casing support member is in threaded engagement with internal threads 80 at the center of freewheel body 26.

Figure 9:
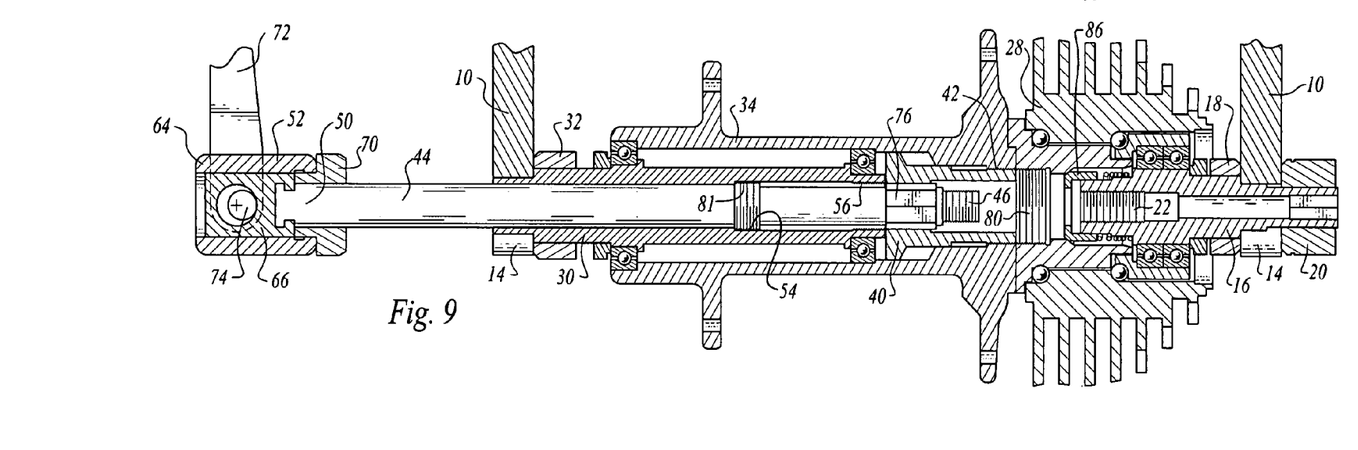
FIG. 9 illustrates the positioning of the hub casing support member relative to the hub casing after rotation of the hub casing support member by the lock bolt.

Continued rotation of the hub casing support member will cause the hub casing support member to disengage from the freewheel body and move to a position shown in FIG. 9 wherein the hub casing support member does not project from the hub casing, but rather is surrounded by the hub casing but still remains in threaded engagement therewith as shown in FIG. 9. It should be noted that at this stage of the operation threaded portion 54 of lock bolt 44 is threadedly disengaged from internal threads 81 of the axle segment 30. The internal space of the axle segment 30 between the internal threads 81 and the internal threads 56 located at the distal end thereof is sufficient to allow to the protrusion 76 to bring the hub casing support member to the retracted position shown in FIG. 9. The threaded connection between threaded portion 54 and threads 81 prevents undue stress being imposed at the connection between the protrusion and hub casing support member.

Figure 10:
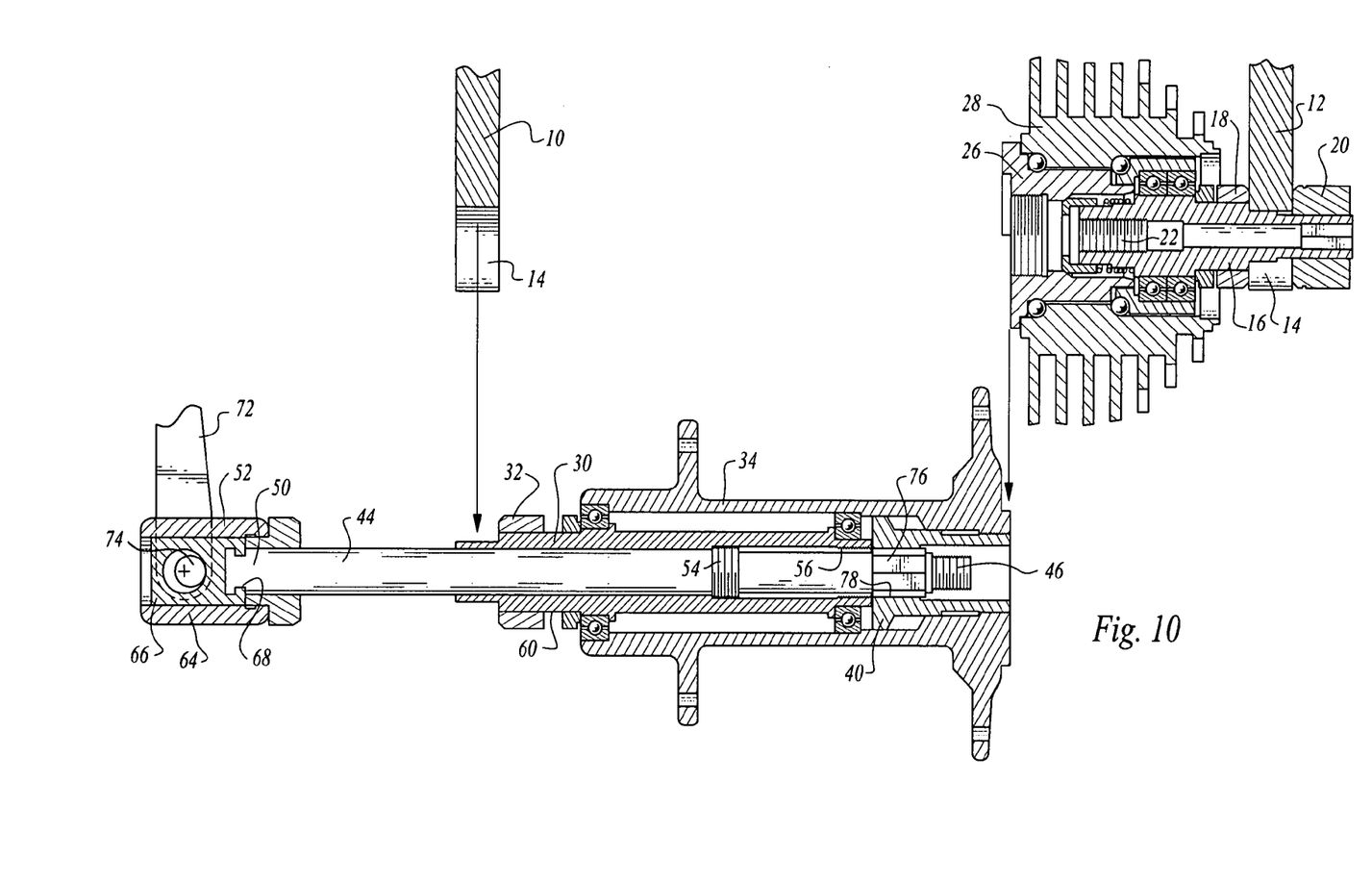
FIG. 10 is a cross-sectional view illustrating the cycle wheel hub and related structural components of the apparatus dropped away from the cycle frame lugs.
Figures 11, 12:
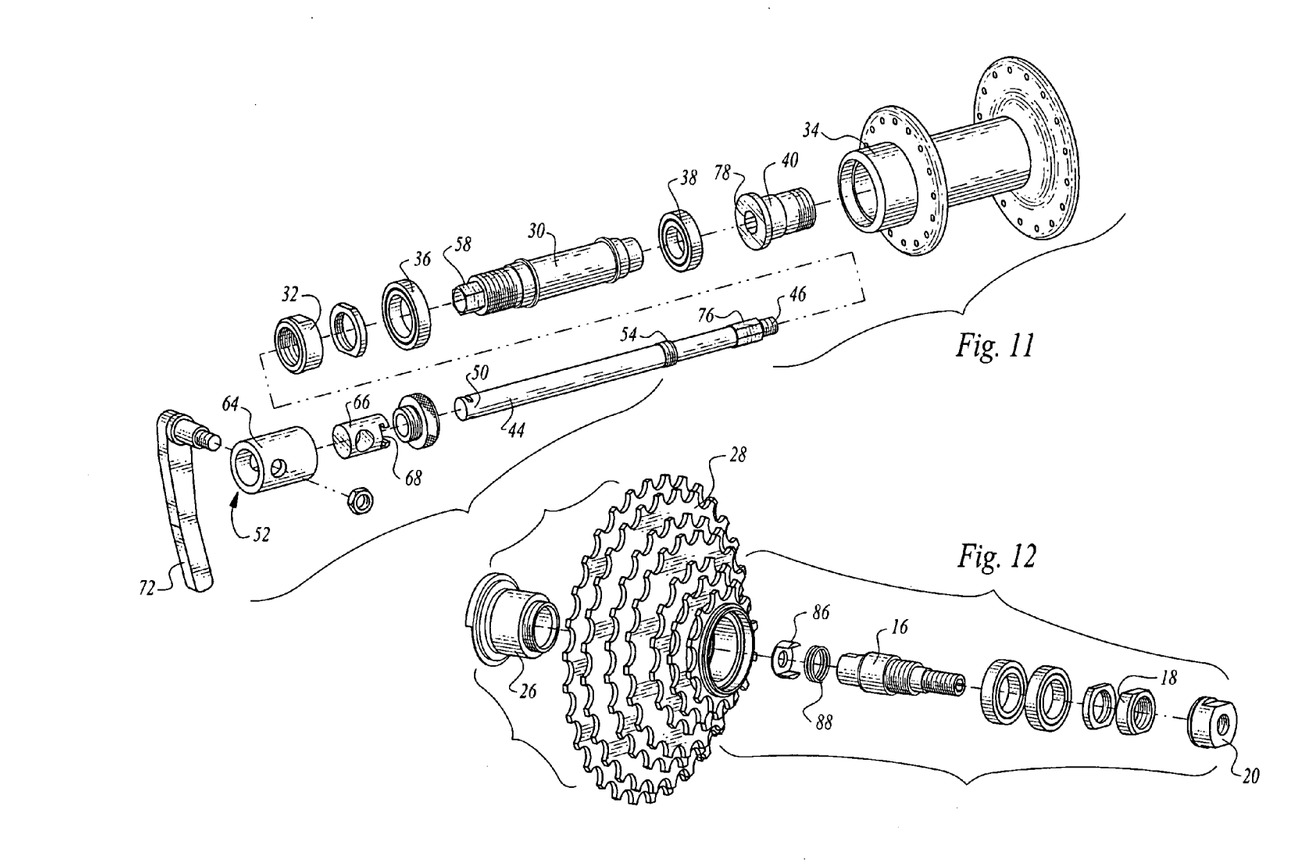
FIGS. 11 and 12 provide an exploded, perspective view of structural components of the apparatus.

At this stage of the operation, the lock bolt is in its second position and the cycle wheel hub is disengageable and separable from the freewheel body. The lock bolt 44, the quick-release cam clamp structure 52, the axle segment 30 and the cycle wheel hub are removable as a unitary assembly as shown in FIG. 10.

Figures 3, 4, 5:
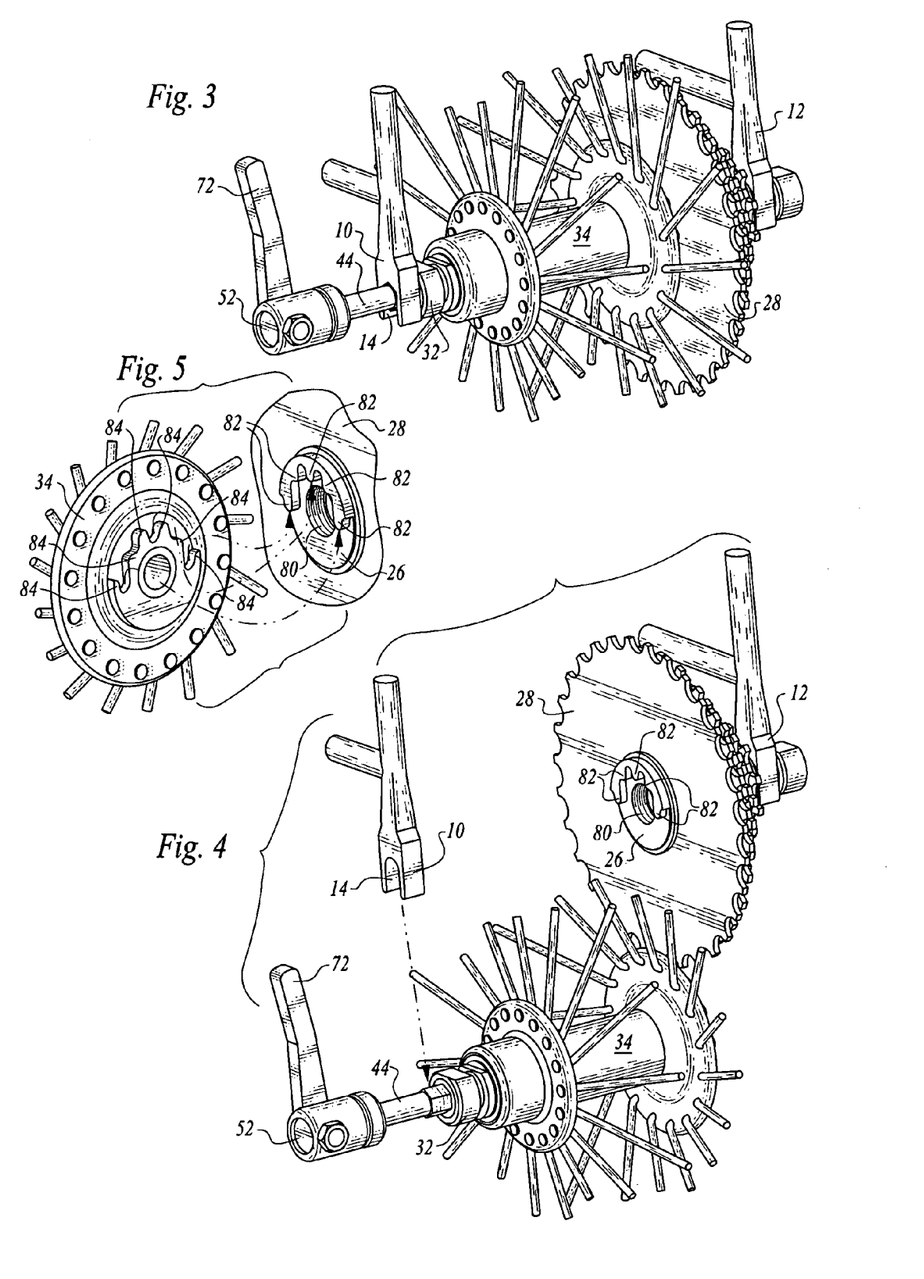
FIG. 3 is a view similar to FIG. 1, but illustrating quick-release cam clamp structure withdrawing a lock bolt to initiate separation from the freewheel body.
FIG. 4 is a perspective view illustrating the cycle wheel hub and other structural components of the apparatus totally separated from the freewheel body.
FIG. 5 is an exploded, perspective view illustrating details of locking structure of the cycle wheel hub and freewheel body.

Referring now to FIGS. 4 and 5, it may be seen that a plurality of lobes 82 defining recesses or detents therebetween project outwardly from the freewheel body, the lobes disposed about the threaded opening 80 of the freewheel body which threadedly receives the hub casing support member when the apparatus is fully assembled. Likewise, a plurality of lobes 84 project from an end of the hub casing 34. The lobes of the cycle wheel hub are received by the correspondingly shaped recesses of the freewheel body and the lobes of the freewheel body are received by the correspondingly shaped recesses of the cycle wheel hub when the apparatus is assembled. This arrangement establishes a multi-point, stable driving interconnection between the cycle wheel hub and the freewheel body with resultant distribution of the forces therebetween to provide spline-like quality, transferring torque in an effective manner.

Reinstallation of the wheel on the frame is essentially merely a matter of reversing the steps described above with respect to disassembly. Reinstallation may be accomplished quickly and effectively. For assembly, it is desirable to maintain the freewheel body at the same location it was in when disassembly took place. This enables the lobes and recesses of the freewheel body and the hub casing to be readily matched when assembly takes place. A holder or retainer 86 is located over the distal end of axle segment 16, essentially being in the shape of a cup having a central aperture which is located over the opening of the internally threaded distal end so that the lock bolt may be readily engaged and disengaged. When the lock bolt is in its first position, protrusion 76 thereof will push the holder 86 inwardly against the pressure of a coil spring 88 surrounding the axle segment 16. This is shown in FIGS. 7 and 8.

When, however, the lock bolt 44 is disengaged from the axle segment 16 the spring 88 will urge the holder into engagement with the freewheel body to resist turning thereof. This simplifies reassembly.

It will be appreciated from the above description that a wheel change may be accomplished quickly and efficiently. Upon removal of the wheel, complete access is provided to the chain, derailleur, cogset and hub mechanism for inspection, lubrication, and any other maintenance that might be required.

The invention claimed is:

1. Apparatus for mounting a cycle wheel on a cycle frame, said cycle frame having first and second mounting lugs, said apparatus comprising in combination:
   a first axle segment connected to said first mounting lug and extending inwardly therefrom toward said second mounting lug;
   a second axle segment connected to said second mounting lug and extending inwardly therefrom toward said first mounting lug;
   a freewheel body mounted on said second axle segment;
   a cycle wheel hub including a hub casing defining a hub casing interior and hub casing open ends communicating with said hub casing interior and a hub casing support member extending through a hub casing open end into said hub casing interior;
   a lock bolt extending through said first mounting lug, said first axle segment and said cycle wheel hub selectively axially movable between a first position wherein said lock bolt engages said second axle segment to provide support for said cycle wheel hub and position said cycle wheel hub in driving engagement with said freewheel body and a second position wherein said cycle wheel hub is disengageable and separable from said freewheel body; and
   quick-release cam clamp structure operatively associated with said lock bolt, said first axle segment and said first mounting lug, said quick-release cam clamp structure clampingly attaching said first axle segment to said first mounting lug when said lock bolt is in said first position and allowing said first axle segment to disconnect from said first mounting lug when said lock bolt is in said second position, said lock bolt having a threaded distal end, a proximal end connected to said quick-release cam clamp structure and a threaded portion between said distal and proximal ends, said lock bolt when in said first position having the threaded distal end thereof in threaded engagement with said second axle segment and the threaded portion thereof in threaded engagement with said first axle segment.

2. The apparatus according to claim 1 wherein the distal end of said lock bolt is disengaged from said second axle segment when said lock bolt is in said second position and the lock bolt, the quick-release cam clamp structure, the first axle segment and the cycle wheel hub removable as a unitary assembly when the lock bolt is in said second position.

3. The apparatus according to claim 2 wherein said hub casing support member has a threaded portion threadedly engaged with said hub casing and is movable between a first location wherein the threaded portion of said hub casing support member projects from said hub casing and is threadedly engaged with said freewheel body and a second location wherein said hub casing support member does not project from said hub casing and does not threadedly engaged said freewheel body.

4. The apparatus according to claim 3 wherein said lock bolt is both rotatably and axially movable by said quick-release clamp structure.

5. The apparatus according to claim 4 wherein said lock bolt has a protrusion located between said threaded distal end and said threaded portion, said protrusion engageable with said hub casing support member after the distal end of said lock bolt is disengaged from said second axle segment and before said lock bolt has moved to said second position, rotation of said lock bolt when said protrusion engages said hub casing support member operable to move said hub casing support member between said first and second locations.

6. The apparatus according to claim 1 additionally comprising locking structure for preventing relative rotation between said cycle wheel hub and said freewheel body when said lock bolt is in said first position and the cycle wheel hub is in driving engagement with said freewheel body.

7. The apparatus according to claim 6 wherein said locking structure comprises a plurality of lobes and cooperating detents receiving said lobes on said cycle wheel hub and freewheel body.

8. The apparatus according to claim 1 including a holder mounted for movement on said second axle segment and movable relative to said second axle segment and said freewheel body to engage said freewheel body to resist rotational movement of the freewheel body after said cycle wheel hub has been separated from said freewheel body.

9. The apparatus according to claim 1 additionally comprising a plurality of spaced bearings located between said first axle segment and said hub casing.

* * * * *